Aug. 29, 1939.  W. S. SCHUYLER  2,171,457
AUTOMATIC AUTO SAFETY CIRCUIT BREAKER
Filed Jan. 5, 1937  2 Sheets—Sheet 1

INVENTOR
WILTON S. SCHUYLER.
BY
Toulmin & Toulmin
ATTORNEYS

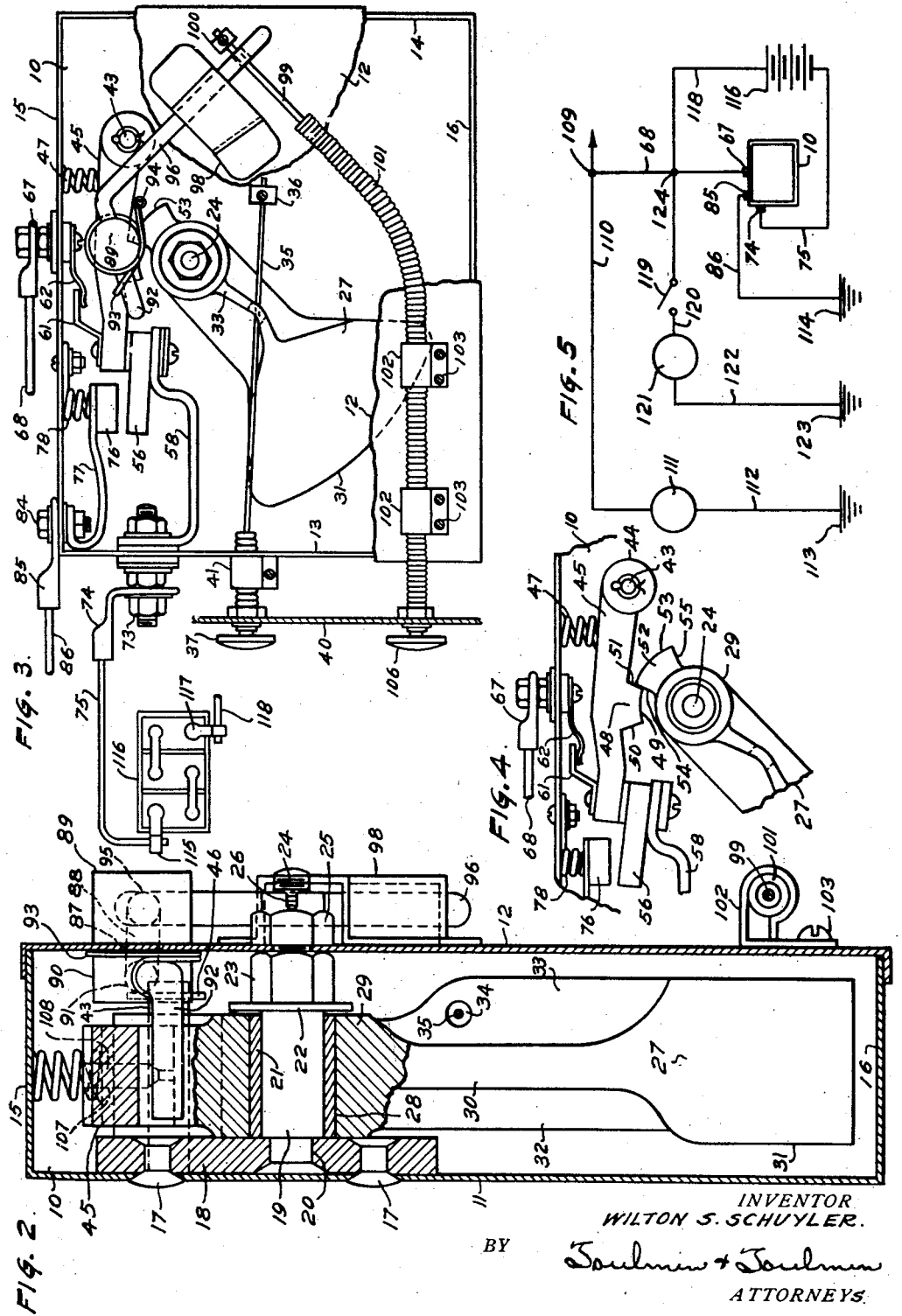

Patented Aug. 29, 1939

2,171,457

UNITED STATES PATENT OFFICE 2,171,457

AUTOMATIC AUTO SAFETY CIRCUIT BREAKER

Wilton S. Schuyler, Springfield, Ohio

Application January 5, 1937, Serial No. 119,106

11 Claims. (Cl. 180—82)

This invention relates to circuit breakers, and in particular, to automatically operative safety circuit breakers for automatically deenergizing the electrical systems of automobiles in the event of collision or overturning.

One object of this invention is to provide a safety circuit breaker for automobiles having means responsive to a predetermined tilt of the device for deenergizing the electrical system of the automobile, and also for maintaining the deenergization until the device is manually reset.

Another object is to provide an automobile safety circuit breaker which is responsive to the tilting of the automobile to a predetermined angle or to a sudden lateral jolt of the automobile to break the circuit between the battery and the electrical system, and also to ground the generator of the automobile so that no electricity is available to ignite any gasoline which may have been spilled, thereby preventing the electrical system from setting fire to the car.

Another object is to provide manual means to operate the automobile safety circuit breaker to enable it to be actuated by the operator in an emergency or after parking the car, so that no fires can originate by reason of short-circuits in the electrical system or by reason of other electrical causes.

Another object is to provide an automobile safety circuit breaker, as described above, wherein automatic latching means is provided for holding the circuit breaker in its position wherein the battery is disconnected and the generator is grounded until the latch is released manually by the operator, thereby preventing the circuit breaker from being closed if the car rolls over into an upright position.

Another object is to provide an automobile safety circuit breaker, as described above, having mechanism which will not be affected when the car is going up or down hill, or by the ordinary jolts experienced in starting or stopping the car, but which will be operative when the car is rammed sidewise or tips forty-five degrees or more laterally.

Another object is to provide an automobile safety circuit breaker through which the battery is grounded to the frame rather than being grounded directly to the frame as in ordinary practice, so that when the device becomes operative, by reason of a collision or overturning of the car, the lines leading from the battery to all parts of the car are completely deenergized.

Another object is to provide an automatic safety circuit breaker for automobiles, actuated by a pendulum, yielding means being provided to apply pressure to the pendulum and also to the electrical contacts so that the ordinary vibration and jolting of an automobile are insufficient to actuate the circuit breaker.

Another object is to provide an automatic safety circuit breaker for automobiles which is mounted in a convenient position, and which has gravity or inertia-responsive means operative in a direction transversely of the car, and adapted to be operated manually, if desired, and also to be reset manually after it has once been operated.

In the drawings:

Figure 2 is an irregular section through the device shown in Figure 1, taken along the irregular section line 2—2 in Figure 1.

Figure 3 is a view, similar to Figure 1, but of reduced size, showing the connection of the battery to the device and with the device in its operative position after a collision or overturning of the automobile.

Figure 4 is an enlarged view of a portion of Figure 3, certain parts being removed to disclose more clearly the engagement between the operating pendulum and the circuit-breaking mechanism.

Figure 5 is a wiring diagram showing the connection of the automatic safety circuit breaker of this invention and the electrical system of the car.

Figure 1:
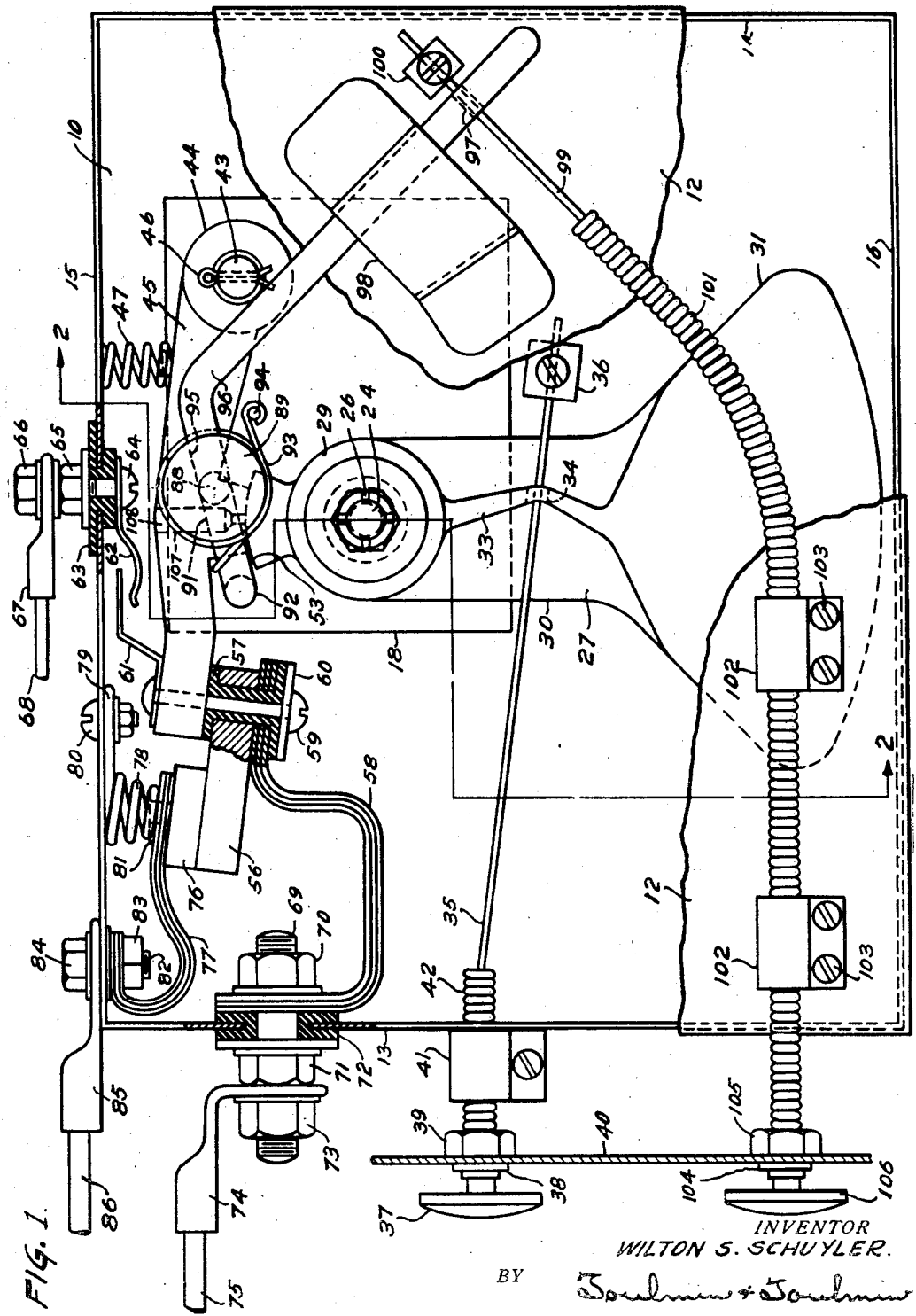
Figure 1 is a side elevation, partly in section, of the automatic safety circuit breaker of this invention, certain portions being broken away to disclose the operating parts more clearly, the circuit breaker being in its normal or inoperative position.

In general, the automatic safety circuit breaker of this invention consists of a movable switch arm having one set of contacts which are normally closed, and another set which are normally open, the switch arm being normally maintained in this position by a pendulum so long as the pendulum remains in an upright position. When the pendulum is tilted beyond a predetermined amount, as when the car overturns or is sharply jolted in a collision, the switch arm is caused to drop, thereby opening the normally closed contacts and closing the normally open contacts. The normally closed contacts are in series with the battery circuit, whereas the normally open contacts are in series with a ground line running from the generator output line. Accordingly, when the pendulum swings through the critical angle the battery circuit is opened and the generator output circuit is grounded.

A manually operated knob is remotely connected to the pendulum to enable it to be operated manually, thereby permitting the deenergization of the electrical system at the will of the operator, as in parking or when an emergency is foreseen by the operator. A manually operated arrangement is also provided for releasing latching mechanism by which the pendulum is held in its tilted position after it is once operated. In this manner the pendulum must be reset manually before the electrical system of the automobile can be reenergized, thereby preventing the safety device from re-connecting the battery to the electrical system in the event that the car completely overturns or rolls and comes to rest right side up. By thus deenergizing the electrical system of the car the fires resulting from the ignition of spilled gasoline, by electric sparks or by hot wires are completely prevented.

Referring to the drawings in detail, Figure 1 shows the automatic safety circuit breaker of this invention as consisting of a casing 10, serving as a supporting frame and having a rear wall 11, a front wall 12, end walls 13 and 14 and top and bottom walls 15 and 16, respectively. Secured to the rear wall 11 of the casing 10 (Figure 2), as by the rivets 17, is a plate 18 upon which a pivot stud bolt 19 is mounted, as in the aperture 20 thereof. The pivot stud bolt 19 is surrounded by an oilless bearing bushing 21, retained in position by the washer 22 and nut 23. Also mounted upon the threaded portion 24 of the pivot stud bolt 19 is a nut 25, adapted to hold the front wall 12 of the casing 10 firmly in engagement with the nut 23. The nut 25 is provided with notches 26 through which cotter pins (not shown) may be passed, these cotter pins likewise passing through holes in the threaded portion 24, thereby firmly locking the nut 25 in its adjusted position.

Tiltably mounted upon the bearing bushing 21 surrounding the pivot bolt 19 is a pendulum, generally designated 27, and having a bore 28 for the reception of the bearing bushing 21. The bore 28 is contained in the hub 29 of the pendulum. From this hub 29 the arm 30 of the pendulum extends downwardly to the counterweight or bob 31 of the pendulum. Members 32 and 33 provide strengthening means for the pendulum arm 30. The member 33 is provided with a hole 34 through which a flexible wire 35 passes for manually operating the pendulum. The wire 35 is provided with an adjustable stop 36 for engaging the web 33, and at its other end is provided with a knob 37 which passes through a flanged guide bushing 38 secured by the nut 39 to the dashboard or bulkhead 40 of the car. Secured to the end wall 13 of the casing 10 is a support 41 for guiding the wire 35 through the casing. The wire 35 is preferably guided for a considerable portion of its length within a flexible conduit 42. Consequently, the operator by pulling the knob 37 may cause the stop 36 to engage and move the pendulum 27.

Likewise mounted upon the plate 18 is a pivot pin 43 which serves to pivotally support the hub 44 of a switch arm, generally designated 45, the whole being retained in engagement by the cotter pin 46. The switch arm 45 is urged downwardly by the coil spring 47, the upper end of which engages the top wall 15 of the casing 10. The bottom edge of the switch arm 45 is provided with a lug 48 having an arcuate portion 49 and tapering portions 50 and 51, respectively.

The pendulum 27 is similarly provided with a projection 52 (Figure 4) extending upwardly from the pendulum hub 29 and provided with an arcuate end 53, of configuration corresponding to the arcuate portion 49 of the lug 48. The pendulum projection 52 is provided with side portions 54 and 55, respectively, for a purpose which will be explained in connection with the operation of the device.

At its outer end the switch arm 45 is provided with a contact member 56, consisting preferably of a heavy piece of copper or bronze bar and insulated therefrom by the insulating sleeve 57. A flexible connection 58, composed of flexible copper or brass strips, is held in engagement with the contact member 56 by the screw 59, which also is provided with a washer 60 for engagement with the insulating sleeve 57 and holding the entire assembly in engagement with the end of the switch arm 45. The upper end of the screw 59 carries a contact arm 61, held in engagement with the switch arm 45, which is of a conducting material.

Opposite the contact arm 61 is a cooperating contact arm 62 secured to the insulating plug 63 by the bolt 64. The plug 63 extends through the top wall 15 of the casing and the bolt 64 carries nuts 65 and 66, to which a terminal 67 of the generator output line 68 is attached. Returning to the flexible connection 58, the outer end thereof is attached to a bolt 69, the nuts 70 and 71 of which hold the bolt firmly in engagement with the insulating plug 72 mounted in the end wall 13 of the casing 10. The nut 73 on the bolt 69 holds the terminal 74 firmly in engagement therewith, this terminal 74 being connected to the battery line 75.

The contact member 56 is positioned to engage a similar contact member 76, of similar material and mounted upon the flexible connector 77, composed of thin strips of elastic metal, such as spring brass. Copper strips may be incorporated with the spring brass strips in order to increase the conductivity thereof. A coil spring 78 is arranged with one end 79 secured to the top wall 15 of the casing, as by the bolt 80, whereas the opposite end 81 is pointed so as to apply an even pressure to the contact member 76 and force it firmly into engagement with the contact member 56. At the same time, the springs 78 and 47 force the arcuate portion 49 of the lug 48 into firm engagement with the arcuate portion 53 of the pendulum extension 52 (Figure 1), thereby preventing the pendulum from swinging under the influence of ordinary road jolts or vibration. The end of the flexible connection 77 is secured, by the bolt 82 and the nuts 83 and 84, to the top wall 15 of the casing 10. The terminal 85 is held firmly thereby in engagement with the casing 10 and is connected to the ground line 86 leading to the frame of the car.

In order to enable the device to be reset after it is once operated, mechanism for lifting the switch arm 45 is provided, as shown in Figures 1, 2 and 3. For this purpose the front wall 12 of the casing 10 is provided with an aperture 87, through which passes the rod 88 having on one end the head 89 and on the other end the head 90. The front wall 12 occupies the space between these heads 89 and 90. The head 90 is provided with a transverse bore 91, through which passes the bent portion 92 of the rod 88 extending beneath the switch arm 45. A coil spring 93 at one end engages the arm 92 to urge it downwardly (Figure 1), whereas its opposite end is anchored by the pin 94 mounted on the front wall 12. The outer head 89 is provided with a bore 95, through which passes another bent portion 96 of the rod 88, the outer end of which is provided with an aperture 97.

The arm 96 is guided at an intermediate point by the guide member 98, secured to the front wall 12 of the casing 10. This guide member 98 serves to limit the motion of the arm 96. Extending loosely through the aperture 97 is a flexible wire 99, having an adjustable stop 100 on the outer end thereof, to the right of the arm 96 (Figure 1). The flexible wire 99 optionally may be a rod. Where remote control, however, is desired it is convenient to use a flexible wire for the member 99 and to guide it for a portion of its length within a flexible conduit, such as the conduit 101. The latter is secured to the front wall 12 of the casing 10 by the clips 102 and screws 103. The flexible conduit 101 terminates in the flanged guide bushing 104 which passes through the bulkhead or dash 40, and is secured thereto by the nut 105. Mounted on the outer end of the flexible wire 99 is a knob 106. By pulling the knob 106 the wire 99 is caused to operate the switch arm 45, thereby permitting the pendulum 27 to swing so that its projecting portion 52 passes beneath the lug 48 on the switch arm 45. When this occurs the pendulum 27 resumes its position shown in Figure 1, if the car is level.

For maintaining the contacting surfaces 49 and 53 in free sliding condition, the switch arm 45 is provided with a hole 107 extending downwardly therethrough and containing a wick 108. The wick is moistened with oil from time to time, and this oil is sufficient to maintain a lubrication of the contacting surfaces 49 and 53. The hub 29 of the pendulum 27 is mounted to permit a slight degree of end play, as shown in Figure 2, so that it can slide to and fro along the pivot stud 19 and thereby maintain the contacting surfaces 49 and 53 in a smooth, free sliding condition. This lengthwise sliding of the pendulum hub 29 along the pivot stud 19 will, of course, occur when the vehicle is started or stopped abruptly because the pivot stud 19 extends in the direction of motion of the car, i. e. longitudinally of the frame.

In mounting the device upon the car the casing 10 is supported in any convenient position, preferably adjacent the dash or steering post, so that the control knobs 37 and 106 may be arranged upon the dash 40. The casing 10 is mounted transversely of the car so that the pendulum 27 likewise swings transversely. The terminal 67 and its wire 68 are connected, as at 109, (Figure 5) to the output line 110 of the generator 111, the remaining line 112 of which is grounded to the frame of the car, as at 13. The wire 86 from the terminal 85 is grounded to the frame, as at 114. The wire 75 leading from the terminal 74 is connected to the terminal 115 of the battery 116, the opposite terminal 117 of which is connected by the line 118 to the starting switch 119, from which the line 120 extends to the starting motor 121, the opposite terminal of which is grounded by the ground line 122 to the frame, as at 123. The battery 116 is therefore not grounded directly to the frame, as in ordinary practice, but only through the automatic safety circuit breaker of this invention, the regular ground strap for the battery being removed during the installation of the circuit breaker.

With the device in its normal position of rest, as shown in Figure 1, and assuming that the car leaves the road and tilts sharply or overturns in the ditch, the pendulum 27 will swing to the right or left, under the action of gravity, overcoming the frictional resistance imparted to the contacting surfaces 49 and 53 by the coil springs 47 and 78. The pendulum 27 will then swing, for example, into the position shown in Figures 3 and 4. It will be understood, of course, that in actuality the pendulum in Figures 3 and 4 is vertical and the casing 10 and dash 40 are tilted according to the amount the car is tilted.

When the pendulum 27 and casing 10 are tilted relatively to one another by a predetermined amount, the pendulum projection 52 passes from beneath the lug 48 on the switch arm 45, whereupon the spring 47 forces the lug 48 downwardly against the side of the projection 52. This feature serves as a latching device, holding the side surfaces 54 and 51 in engagement with one another even though the car may roll completely over and come to rest right side up. Of course, if the car tilts in the opposite direction instead of the direction described, the pendulum 27 will tilt in the opposite direction and come to rest with the side surface 55 engaging the side surface 50 of the lug 48 (Figure 4).

When the arm 45 moves downwardly the contact members 56 and 76 immediately sever their connection, thereby opening the circuit between the line 75 leading from the battery terminal 115 and the line 86 leading to the ground on the frame. The battery is thereby completely disconnected from the entire electrical system of the car and is incapable of delivering any electricity to cause sparks or short-circuits of any sort. Almost simultaneously with this action, but slightly thereafter, the contact arms 61 and 62 engage one another, thereby closing the circuit between the ground line 86 and the line 68 leading to the generator output line 110. In this manner the generator output line 110 is immediately grounded so its current is immediately rendered ineffective for causing sparks or short-circuits, and is also prevented from burning out the lights, if the lights are on.

Thus the electrical system of the car is automatically rendered inoperable and incapable of creating sparks or hot wires which might ignite spilled gasoline. The occupants of the car, even though they may be trapped within the car by a collision or overturning thereof, are protected against the outbreak of fire with its disastrous consequences. The ignition system of the car is also instantaneously rendered inoperative so that it cannot create sparks, either to ignite spilled gasoline directly or to enable the motor to backfire through the carburetor and ignite such gasoline as might be spilled out of the carburetor.

The automatic safety circuit breaker of this invention also becomes operative in the event of a collision where the car is rammed from one side and forced laterally with a sudden jolt. This sudden jolt, although insufficient to tilt the car the prescribed amount, nevertheless will cause the pendulum 27 to swing laterally because of its inertia, into the position shown in Figure 3 or its counterpart. When this occurs the device becomes in exactly the same condition as previously described, the battery ground line becoming disconnected and the generator becoming automatically grounded, in the manner set forth above. The latching means, consisting of the lug 48 and the pendulum projection 52, will hold the device in its safety position until the operator pulls the knob 106, thereby lifting the switch arm 45 and permitting the pendulum 27 and its projection 52 to swing back beneath the lug 48 on the switch arm 45. In this manner the safety device remains in its safety position until the operator deliberately resets it. If, therefore, the car leaves the road and rolls over and over, as down an embankment, the safety device will act immediately and remain in a safety position even though the car comes to rest in its upright position.

The automatic safety circuit breaker of this invention is also a valuable protection when the car is parked or put away in the garage. In that event the operator pulls the knob 37, thereby forcing the pendulum into its position shown in Figure 3, and operating the safety devices previously described. The battery is therefore disconnected from the remainder of the electrical system and the generator automatically grounded. Thus, if insulation upon any of the wires has been broken, such as by the shifting or weaving of the frame or body, the short-circuit cannot cause the wires to become heated or the battery to become drained of its charge in the absence of the operator. In this manner the device protects the car from fires arising from electrical sources while the operator is absent, and also protects the battery from being completely discharged. This precaution may also be taken when the car is parked upon the street, and operates in the same effective manner.

The device, however, will not be affected while the car is merely going up or down hill, or in stopping and starting, because the axis of the pendulum is arranged longitudinally of the car and the pendulum itself operates only in a transverse direction. In this manner the electrical system is prevented from accidental deenergization on steep hills or in sudden stops. The safety device can instantly be put into operation, however, in an emergency in the event that the operator foresees a collision, or another type of accident. If he foresees the emergency and pulls the knob 37 he immediately protects the car and its passengers from danger of fire without the necessity of depending upon the automatic operation thereof. In this way the car and its passengers are doubly assured of protection for if the operator is unable or forgets to operate the device manually by pulling the knob 37, it will operate automatically through the action of the pendulum 27 and prevent a dangerous fire and possible loss of life through this cause. Normally the battery 116 is charged by the generator 111 through the connection 124 of its output line 110 and branch line 68 with the battery line 118, but these lines are grounded at once when the device becomes operative.

In particular, the casing 10 is arranged transversely of the automobile, as previously stated. Figures 1 and 3 for convenience, however, show the dash 40 to one side of the casing 10 instead of in front of it. In this manner the positions of the knobs 37 and 106 and their connections may be completely shown in one view, which would not be the case if they were arranged as they are actually mounted in the automobile. The casing 10 as actually mounted in the automobile is therefore parallel with the dash 40 rather than perpendicular to it, as shown for convenience in Figures 1 and 3. The manual controls, however, may be mounted upon any other suitable portion of the machine, such as the steering post. The daily use of this manual control has the added result of moving the working parts so that they will always be ready for action automatically and not be liable to inaction from corrosion or sticking, as would be likely were the device purely automatic.

The spring 47 has the added result of maintaining the switch arm 45 in its detained position with the generator grounded and the battery disconnected, even if the car remains upside down. This can be seen by inverting Figures 3 and 4. The spring 78, moreover, is positively secured to the flexible connection 77 and contact 76 so that it serves not only as a compression spring to urge these ordinarily into engagement with the contact 56, but in an emergency serves as a tension spring to hold the contact 76 from remaining in engagement with the contact 56 as the latter is pulled away by the operation of the pendulum 27, switch arm 45 and spring 47. The springs 47 and 78 also serve to form additional electrical connections between the casing top 15, with its ground connection terminal 85 and the switch arm 45 and contact 76, respectively.

The mechanically operated remote control shown may be replaced by an electromagnetic, hydraulic, pneumatic or other remote control without departing from the scope of the invention. The casing 10 ordinarily is provided with an inspection aperture and cover plate opposite the contacts 56, 76 and 61, 62, whereby these may be inspected from time to time.

It will be understood that I desire to comprehend within my invention such modifications as come within the scope of the claims and the invention.

Having thus fully described my invention, what I claim as new and desire to secure by Letters Patent, is:

1. A gravity operated circuit control device by which the battery circuit of a motor vehicle is automatically opened and maintained open and the generator circuit thereof short circuited to ground and so maintained upon tilting motion of the vehicle to abnormal degree, including a pendulum mounted for swinging motion in alternate directions, a concentric segmental extension carried thereby, a duofunctional spring actuated pendulum brake and circuit breaker pivoted arm, a lug carried by the arm and normally bearing upon the segmental extension of the pendulum to frictionally retard free motion thereof, said lug being projected beyond the extremity of the segmental extension into interlocking engagement therewith whenever the pendulum swings beyond a predetermined intermediate range in either direction, a pair of electrical contacts carried by the arm and alternately opened and closed by movement of the arm into and out of interlocking relation with the pendulum, and a duofunctional spring means subjecting said pivoted arm to braking pressure upon the pendulum and maintaining one of said contacts in closed relation with its mating contact when the arm is in braking relation with the pendulum and maintaining the other of said contacts in closed relation with its mating contact when the arm is in pendulum locking relation, to alternately maintain the battery circuit and the generator circuits respectively in closed condition.

2. A gravity operated circuit control device by which the battery circuit of a motor vehicle is automatically opened and maintained open and the generator circuit thereof short circuited to ground and so maintained upon tilting motion of the vehicle to abnormal degree, including a pendulum mounted for swinging motion in alternate directions, a duofunctional spring actuated pendulum brake arm and circuit breaker arm for retarding the movement of the pendulum under ordinary driving conditions, and alternately opening and closing the battery and generator circuits under control of the pendulum movement, means for automatically locking the pendulum in its operated position upon movement thereof beyond a predetermined intermediate range of movement, a pair of electrical circuit closers alternately opened and closed incident to the movement of the duofunctional brake and circuit breaker arm.

3. In a circuit control device for motor vehicles, a pendulum mounted for to and fro swinging motion within a limited predetermined range of motion, a segmental head for the pendulum oscillating in unison therewith, a spring actuated circuit control member normally exerting frictional braking influence upon the periphery of the segment within the normal range of movement of the pendulum and projected into locking engagement therewith upon movement of the pendulum beyond its normal range in either direction to thereby hold the pendulum in its operated position, and an electrical circuit make and break device operated by the movement of the spring actuated latch member.

4. The combination with an electrical circuit breaker of a motor vehicle, of gravity operated control means therefor including a swinging pendulum mounted for to and fro swinging motion within a limited predetermined range, a concentric segmental portion carried thereby for unison oscillation, a duofunctional brake and locking member normally riding upon the periphery of the segment and retarding movement of the pendulum within a normal range thereof and automatically engageable therewith to positively lock the pendulum upon swinging movement thereof in either direction beyond its normal range, and an electrical circuit make and break device controlled by the movement of the pendulum.

5. In an automatic circuit breaker for motor vehicles wherein an electrical circuit make and break device is actuated incident to tilting movement of the vehicle beyond a predetermined range of inclination, a pendulum mounted for swinging motion including a pivoted arm supported by the pendulum within a predetermined range of swinging movement thereof, a circuit contact carried by the arm, a mating contact yieldingly supported in position to be engaged by the first contact, a spring mounting therefor held under tension by the supporting engagement of the pivoted arm with the pendulum under the reactive pressure of the spring mounting for the contact, the construction being such that upon swinging motion of the pendulum to an abnormal position the pivoted arm will be released for relative movement about its pivotal connection by which the engaging contacts are separated one from the other.

6. An automatic safety control device for motor vehicles wherein an electrical circuit breaker is operated incidental to abnormal change of vehicle movement, including a prime moyer mounted for movement to and fro within a predetermined limited range incident to normal fluctuations of the vehicle travel, a spring actuated pivoted arm supported by and having frictional braking engagement with the prime mover within its normal range of to and fro movement, and dislodged therefrom upon movement thereof beyond such predetermined normal range, circuit make-break contacts controlled by movement of the arm, positive locking means for the prime mover operative upon movement of the latter to an extreme position beyond its normal range for temporarily locking the latter in its operated position, and remote control manual means for releasing the prime mover to restore the circuit breaker contacts and enable return of the prime mover to normal supporting relation with the arm.

7. An automatic safety control device for motor vehicles wherein an electrical circuit breaker is operated incidental to abnormal change of vehicle movement, including a prime mover mounted for movement to and fro within a predetermined limited range incident to normal fluctuations of the vehicle travel, a spring actuated pivoted arm supported by and having frictional braking engagement with the prime mover within its normal range of to and fro movement, and dislodged therefrom upon movement of the prime mover beyond such predetermined normal range, circuit make-break contacts controlled by movement of the arm, interengaging portions upon the prime mover and the pivoted arm interengageable upon dislodgement of the arm from frictional braking engagement with the prime mover by movement of the latter to an extreme position beyond its normal range for temporarily locking the prime mover in its operated position of adjustment beyond its normal range of free to and fro movement, and remote control means for manually moving the prime mover to effect interlocking engagement of the pivoted arm and prime mover and reversal of the electrical circuit contacts independently of the vehicle operation.

8. An automatic safety control device for motor vehicles wherein an electrical circuit breaker is operated incidental to abnormal change of vehicle movement, including a prime mover mounted for movement to and fro within a predetermined limited range incident to normal fluctuations of the vehicle travel, a spring actuated pivoted arm supported by and having frictional braking engagement with the prime mover within its normal range of to and fro movement, and dislodged therefrom upon movement thereof beyond such predetermined normal range, circuit make-break contacts controlled by movement of the arm, interlocking portions upon the prime mover and the pivoted arm engageable upon dislodgment of the arm from braking engagement with the prime mover by movement of the latter to an extreme position beyond its normal range for temporarily locking the latter in its operated position of adjustment, and a spring mounting for one of the circuit make-break contacts duofunctionally yieldingly supporting such contact in tensioned contact relation with the opposing contact and tensioning the frictional braking engagement of the arm with the prime mover.

9. A circuit control device for a motor vehicle circuit actuated by abnormal operation of the vehicle, including a prime mover mounted for independent to or fro motion under influence of abnormal vehicle movement, a duofunctional brake and circuit breaker arm associated therewith and exerting frictional braking resistance thereon within a predetermined normal range of movement thereof, circuit make and break contacts carried by the arm, and a duofunctional spring exerting braking tension upon the arm and maintaining at least one circuit make and break contact in closed relation.

10. A circuit control device for a motor vehicle circuit actuated by abnormal operation of the vehicle, including a prime mover mounted for independent to or fro motion under influence of abnormal vehicle movement, a circuit breaker arm, a pair of independent circuit make and break contacts carried thereby, said arm being normally supported by the prime mover to maintain one of the contacts in closed relation during normal vehicle operation and released by the prime mover upon abnormal vehicle movement to permit movement of the arm to open said closed circuit breaker contact and to simultaneously close a second circuit breaker contact, and dual springs exerting tension upon said arm conjointly while said arm is supported by the prime mover, one of said springs being operative to maintain one of said circuit make and break contacts closed under normal operating conditions, and the other spring being operative to maintain the other of the circuit make and break contacts closed upon abnormal movement of the vehicle.

11. A circuit control device for a motor vehicle circuit actuated by abnormal operation of the vehicle, including a prime mover mounted for independent to or fro motion under influence of abnormal vehicle movement, circuit make and break contacts controlled thereby, a locking detent for the prime mover operative upon movement thereof beyond a predetermined normal range of movement to lock the prime mover in its operated position, a retracting means for said locking detent, and remote control manually operative means for moving the prime mover beyond its normal range of movement to effect locking engagement of the detent therewith independently of vehicle operation and to retract said locking detent to permit return of the prime mover at will.

WILTON S. SCHUYLER.